United States Patent [19]

Furukawa et al.

[11] Patent Number: 5,076,962
[45] Date of Patent: *Dec. 31, 1991

[54] FERROELECTRIC CHIRAL SMECTIC LIQUID CRYSTAL COMPOSITION

[75] Inventors: Kenji Furukawa, Yokosukashi; Kanetsugu Terashima, Yokohamashi, both of Japan

[73] Assignees: Chisso Corporation, Osaka; Hitachi, Ltd., Tokyo, both of Japan

[*] Notice: The portion of the term of this patent subsequent to Jul. 24, 2007 has been disclaimed.

[21] Appl. No.: 836,749

[22] Filed: Mar. 6, 1986

[30] Foreign Application Priority Data

Mar. 12, 1985 [JP] Japan ................................ 60-48546
Apr. 5, 1985 [JP] Japan ................................ 60-72270

[51] Int. Cl.$^5$ ..................... C09K 19/12; C09K 19/06; C09K 19/52; G02F 1/13
[52] U.S. Cl. ..................... 252/299.65; 252/299.01; 252/299.6; 252/299.68; 252/299.66; 252/299.67; 359/104
[58] Field of Search ................ 252/299.65, 299.66, 252/299.67, 299.68, 299.6; 350/350 S

[56] References Cited

U.S. PATENT DOCUMENTS

| | | | |
|---|---|---|---|
| 4,257,911 | 3/1981 | Gray et al. | 350/350 S |
| 4,264,148 | 4/1981 | Göbl-Wunsch et al. | 350/350 S |
| 4,561,726 | 12/1985 | Goodby et al. | 350/350 S |
| 4,576,732 | 3/1986 | Isogai et al. | 350/350 S |
| 4,613,209 | 9/1986 | Goodby et al. | 350/350 S |
| 4,615,586 | 10/1986 | Geary et al. | 350/350 S |
| 4,622,165 | 11/1986 | Kano et al. | 252/299.65 |

FOREIGN PATENT DOCUMENTS

| | | | |
|---|---|---|---|
| 115693 | 8/1984 | European Pat. Off. | 252/299.67 |
| 136725 | 4/1985 | European Pat. Off. | 252/299.67 |
| 82-14822 | 1/1982 | Japan | 252/299.01 |
| 82-212418 | 12/1982 | Japan | 252/299.01 |

OTHER PUBLICATIONS

Goodby et al., J. American Chemical Society, vol. 108, pp. 4729–4735 (1986).
Gray et al., Mol. Cryst. Liq. Cryst., 34, 1977, pp. 211–217.
Goodby et al., Liq. Cryst. Ord. Fluids, vol. 4, 1984, pp. 1–32.

*Primary Examiner*—John S. Maples
*Assistant Examiner*—Philip C. Tucker
*Attorney, Agent, or Firm*—Fred Philpitt

[57] ABSTRACT

A ferroelectric chiral smectic liquid crystal composition containing two kinds of chiral smectic liquid crystal compound is provided. One of the said compounds shows twist sense of helix of right-handed and the other show twist sense of helix of left-handed and the direction of spontaneous polarization of component chiral smectic liquid crystal compounds is the same. This composition provides a liquid crystal display element which shows very quick response.

12 Claims, 6 Drawing Sheets

FERROELECTRIC CHIRAL SMECTIC LIQUID CRYSTAL COMPOSITION cl BACKGROUND OF THE INVENTION

1. Field of the Invention

This invention relates to a smectic liquid crystal composition and a liquid crystal display element which utilizes the above-mentioned composition. More particularly, it relates to a ferroelectric chiral smectic liquid crystal composition consisting of ferroelectric chiral smectic compounds having the same direction of spontaneous polarization and a liquid crystal display element which shows very quick response by using the above-mentioned composition.

2. Description of the Prior Art

Liquid crystal compounds are now being used widely as display materials but liquid crystal display elements are mostly of TN type display mode and as liquid crystal materials, those belonging to a nematic phase are used. Since TN type display mode is a non-emissive type, it has characteristic features that it does not give fatigue to eyes and works with extremely small power consumption On the other hand, it has such defects as slow response and impossibility of observation depending upon the angle from which it is viewed. Recently, a demand, particularly for quick response property has been made and attempt to improve liquid crystal material has been made to meet such a demand. However, compared with other emissive displays (e.g. electroluminescence display, plasma display, etc.), a great delay of response time cannot be solved by TN display mode.

To maintain the good response property comparable to emissive displays without losing the characteristic features of non-emissive type as well as its low power consumption, it is indispensable to develop a new liquid crystal display mode which can substitute for a TN type display mode. In one of such attempts, a proposal of display device which utilizes the light switching phenomenon of a ferroelectric liquid crystal was made by N. A. Clark and S. T. Lagerwall [see Appl. Phys. Lett., 36,899 (1980)]. The existence of a ferroelectric liquid crystal was disclosed for the first time by R. B. Meyer et al in 1975 [see J. Physique 36, L-69 (1975)]. From a standpoint of liquid crystal structure, this liquid crystal belongs to chiral smectic C phase, chiral smectic I phase, chiral smectic F phase, chiral smectic G phase, and chiral smectic H phase (hereinafter abbreviated as Sc* phase, $S_I$* phase, $S_F$* phase, $S_G$* phase, and $S_H$* phase, respectively).

Application of light switching effect of Sc* phase to display elements has three superior characteristic features, as compared with TN display mode. The first feature is its very quick response. Its response time is less than 1/100 as compared with that of a common TN display mode. The second feature is that it has a memory effect which makes multiplexing drive easy to adopt in co-operation with the above-mentioned quick response The third feature is the easiness of attaining the gray scale (gradation of brightness). In case of a TN display mode, since gray scale is attained by controlling applied voltage, there are difficult problems such as temperature dependence of threshold voltage, voltage dependence of response time, etc. On the other hand, when light switching effect of Sc* phase is applied, gray scale can be attained easily by controlling polarity-inversion time. Thus the latter is very suitable for graphic display or the like.

As display methods, two methods can be considered. One of them is birefringence type which uses two polarizer plates and the other is guest-host type which uses dichroic dyes. Since Sc* phase has spontaneous electric polarization, a molecule turns over by a $\pi$ rotation around a helical axis, which is an axis of rotation, by inverting the polarity of applied voltage. By filling a liquid crystal composition having Sc* phase into a liquid crystal display cell that has been subjected to a surface treatment for aligning liquid crystal molecules parallel to electrode surface, and placing the liquid crystal cell between two polarizers arranged in advance so that the polarization plane of one of the polarizers is parallel to the director of liquid crystal molecules and inverting the polarity of applied voltage, the bright range of vision and dark range of vision (which are determined by the angle between the polarization planes) can be interexchanged. On the other hand, when operated by guest-host mode, colored range of vision and colorless range of vision (which are determined by the arrangement of polarization plates) can be interexchanged by inverting the polarity of applied voltage.

It is considered necessary that Sc* phase has spontaneous electric polarization and can take two stable states (bistable states) on the electrode surfaces by the inversion of polarity of applied voltage. To obtain liquid crystal display elements having such bistable states and quick response property, it is necessary to make cell gap d not greater than helical pitch P (d≦P) and to unwind the helix as proposed by N. A. Clark et al [see, N. A. Clark, S. T. Lagerwall Appl. Phys. Lett., 36,899 (1980)].

In general, ferroelectric liquid crystal compounds available now have mostly short helical pitches (about 1~3 μm). It is necessary to make cell gaps in the range of about 1~2 μm to unwind the helix of these compounds. With the present cell manufacturing techniques, this presents difficult problems in cost and yield of display. Since the cell gap presently used in TN type display mode, is on the order of about 5~10 μm, it is desired to set helical pitch to 5 μm or greater in order to make ferroelectric liquid crystal displays practicable.

In the attainment of the above-mentioned bistable states of a display element which uses ferroelectric liquid crystal, there is, in general, a relation of $$E_c = \frac{\pi^4 K}{4P \cdot Ps} \quad (1)$$

among a threshold voltage $E_c$ necessary to invert molecules, a helical pitch P, and a spontaneous electric polarization Ps [see B. Meyer; Mol. Cryst. & Liq. Cryst., 40,33 (1977)]. In the equation (1) K is a torsional elastic constant at the time of deformation due to turning-over of molecule. As evident from the equation (1), to make a threshold voltage smaller, it is necessary that a helical pitch be longer and spontaneous electric polarization be larger. However, among the ferroelectric liquid crystal compound available now there is no ferroelectric liquid crystal compound which has a long helical pitch and a large spontaneous electric polarization. Almost all of the known ferroelectric liquid crystal compounds have a short helical pitch. Accordingly, several kinds of ferroelectric liquid crystal compound must be mixed to make a ferroelectric liquid crystal composition having a long helical pitch and a large spontaneous electric polarization.

SUMMARY OF THE INVENTION

As is apparent from the above, an object of this invention is to provide a practical chiral smectic liquid crystal composition showing a large spontaneous polarization and a long helical pitch. Another object of this invention is to provide a light switching element capable of making extremely quick response.

We, the inventors of the present invention, already found that a liquid crystal composition consisting of a chiral smectic liquid crystal compound in which the twist sense of helix is right-handed and a chiral smectic liquid crystal compound in which twist sense of helix is left-handed, is a ferroelectric chiral smectic liquid crystal composition having an extended helical pitch and highly practical value (see, Laid open Japanese patent application No. 90290-1985 or European patent publication No. 0136,725 A2). While we further continue the research relative to ferroelectric chiral smectic liquid crystal, it has become clear that there appears occasionally a composition point at which spontaneous polarization of a composition is drastically reduced and no spontaneous polarization is shown. We have improved the invention by adding a means for avoiding the above-mentioned vanishment of spontaneous polarization of the composition to complete the present invention.

The first aspect of the present invention resides in (1) A ferroelectric chiral smectic liquid crystal composition containing two chiral smectic liquid crystals compound in one of which twist sense of helix is right-handed and in the other twist sense of helix is left-handed, which is characterized in that the direction of spontaneous polarization of component chiral smectic liquid crystal compounds is same and the embodiments are shown in the following items from the second to the six.

(2) A ferroelectric chiral smectic liquid crystal composition described in the foregoing first item in which the chiral smectic liquid crystal compound is an optical active compound represented by a general formula

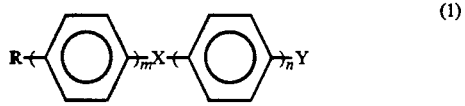

(1)

wherein m and n represent, respectively integer of 1 or 2; R represents an alkyl or alkoxy group having 1~18 carbon atoms; Y represents an alkyl, alkoxy, alkoxycarbonyl, alkanoyl or alkanoyloxy group having asymmetric carbon atom; and X represents

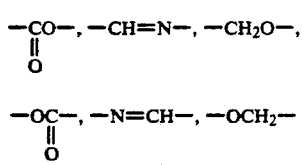

or a single bond.

(3) A ferroelectric chiral smectic liquid crystal composition described in the foregoing second item in which the chiral smectic liquid crystal compound in which twist sense of helix is right-handed, is an optically active compound in which the absolute configuration in the side chain Y of the formula (1) is sinister and an asymmetric carbon atom is on an even position counting from the carbon of benzene ring connected with Y or an optically active compound in which the absolute configuration in the side chain Y of this formula is rectus and an asymmetric carbon atom is on the odd position counting from the carbon of benzene ring connected with Y.

(4) A ferroelectric chiral smectic liquid crystal composition described in the foregoing second item in which the chiral smectic liquid crystal compound in which twist sense of helix is left-handed, is an optically active compound in which the absolute configuration in the side chain Y of the formula (1) is sinister and an asymmetric carbon atom is on the odd position counting from the carbon of benzene ring connected with Y or an optically active compound in which the absolute configuration in the side chain Y of this formula is rectus and an asymmetric carbon atom is on the even position counting from the carbon of benzene ring connected with Y.

(5) A ferroelectric chiral smectic liquid crystal compositions described in the foregoing second item in which chiral smectic liquid crystal compound in which twist sense of helix is right-handed, is an optically active compound in which a side chain Y of the formula (1) is

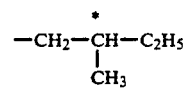

and its absolute configuration is sinister and chiral smectic liquid crystal compound in which twist sense of helix is left-handed, is an optically active compound in which a side chain Y of the formula

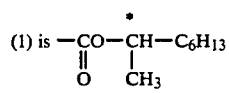

and its absolute configuration is siniter or a side chain Y is

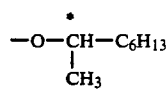

and its absolute configuration is rectus.

(6) A ferroelectric chiral smectic liquid crystal composition described in the foregoing second item in which a chiral smectic liquid crystal compound in which twist sense of helix is right-handed is an optically active compound in which a side chain Y of the formula (1) is sinister in the absolute configuration of optical active group and having a formula

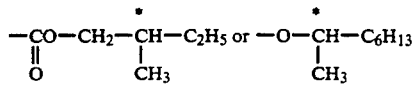

or Y is rectus in absolute configuration and having a formula

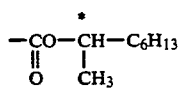

and a chiral smectic liquid crystal compound in which twist sense of helix is left-handed, is an optically active compound in which a side chain Y of the formula (1) is sinister in absolute configuration of optically active group and having a formula of

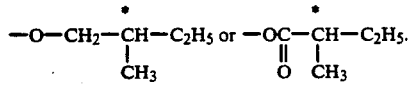

The second aspect of the present invention resides in (7) A light switching element which utilizes a ferroelectric chiral smectic liquid crystal composition which is characterized in that the direction of spontaneous polarization of component chiral smectic liquid crystal compound is the same in a ferroelectric chiral smectic liquid crystal composition consisting of two kinds of chiral smectic liquid crystal compound in one of which twist sense of helix is right-handed and in the other twist sense of helix is left-handed.

DETAILED EXPLANATION OF THE INVENTION

Figure 1:
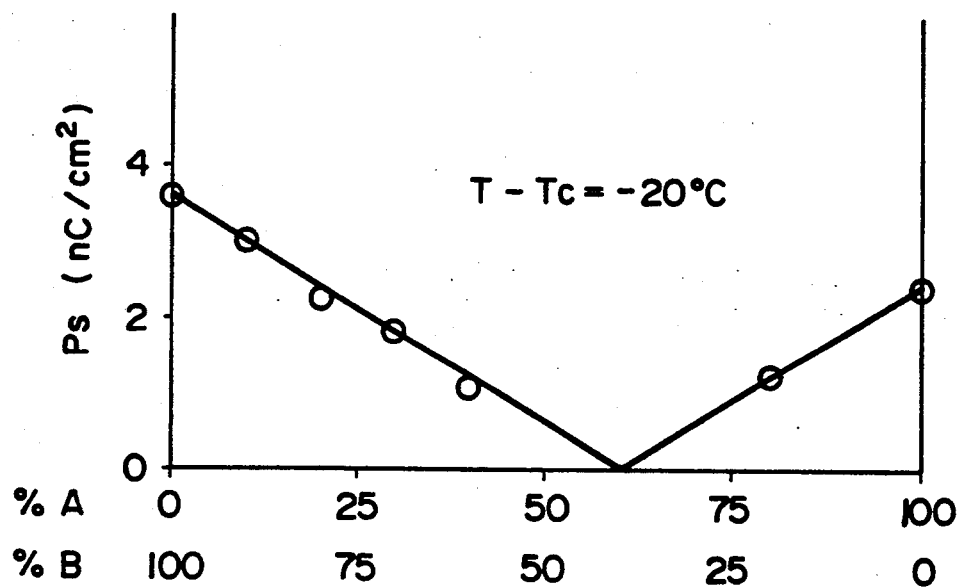
FIGS. 1, 3, 5, 7 and 9 show the change in spontaneous polarization with variation of concentration of compounds in mixtures of the present invention.

As is well known, there are S type (Sinister type) and R type (Rectus type) in the absolute configuration of optically active groups. Even in compounds represented by the same constructional formula, there are two kinds of compound which are in the relation of enantiomer. For example for optically active 2-methyl butanol, there are two kinds of isomer.

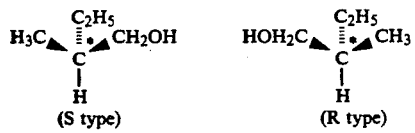

For optical active 1-methyl heptanol, there are two kinds of isomer.

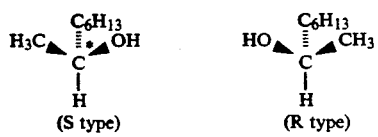

Similarly, for 2-methylalkane-1-ol which is a raw material of the component compound of the composition of the present invention, there are following 2 kinds of absolute configurations.

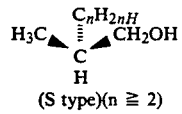 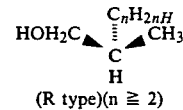

Further, it is considered that for 1-methylalkane-1-ol, there are following 2 kinds of absolute configuration.

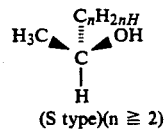 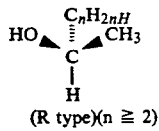

When synthesis of chiral smectic liquid crystal compound is to be carried out from these optically active substances, the absolute configuration of products can be considered as follows.

When 2-methylalkane-1-ol is used as a raw material, since the asymmetric carbon atom is not reaction point during the course of synthesis, the absolute configuration does not change, before and after the reaction. In other words, the absolute configuration of a product is the same with that of a raw material compound. On the other hand, when 1-methylalkane-1-ol is used as a raw material, the asymmetric carbon atom can be a reaction point and hence the absolute configuration is turned over before and after a reaction depending upon a synthesis method. There is a possibility of occurrence of so-called Walden inversion.

In fact, in case of a chiral smectic liquid compound, wherein Y of the formula (1) of the present invention, is

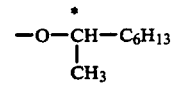

and which is prepared by way of steps including a Walden inversion therein during the course of synthesis, with regard to an asymmetric carbon atom, its absolute configuration is reverse to its raw material, 1-methylheptane-1-ol. Namely from 1-methylheptane-1-ol of S type, there is obtained 1-methylbutane-1-ol derivative of R type.

Twist sense of helix can be divided into right-handed one and left-handed one according the position of an asymmetric carbon atom in the side chain of a compound. This is interpreted (by the odd-even rule of arrangement of atoms)

that the direction of coming out of methyl group (—ch$_3$) connected with an asymmetric carbon atom (C*) is alternate depending upon the position of the asymmetric carbon atom. (For example, M. Tsukamoto et al., Japan J. Appl. phys., 14 (1975) 1307). In case of optically active chiral nematic liquid crystal compounds which have asymmetric carbon atom and show cholesteric phase, if the absolute configuration of the optical active group is of S type, it is known that twist sense of helix is right-handed, in case of compounds wherein the position of the asymmetric carbon atom of a side chain counting from the carbon atom of benzene ring is even and twist sense of helix is left-handed, in case of compounds wherein it is odd.

With regard to twist sense of helix of chiral smectic liquid crystal compound, similar fact is predictable. In fact, in case of the absolute configuration of an optically active group of S type, and if the position of an asymmetric carbon atom in side chain is even, counting from the carbon atom of benzene ring, twist sense of helix is right-handed, and if it is odd, twist sense of helix is left-handed. On the other hand, in case of the absolute configuration of an optically active group of R type, the fact is reverse to that of S type i.e. if the position of an asymmetric carbon of a side chain is even, counting from the carbon atom of benzene ring, twist sense of helix is left-handed and if it is odd, twist sense of helix is right-handed. The reversal of twist sense of helix in S type and in R type, can be easily interpreted from the fact that a racemate which is an equal amount mixture of S type and R type, does not have helical structure.

Figure 2:
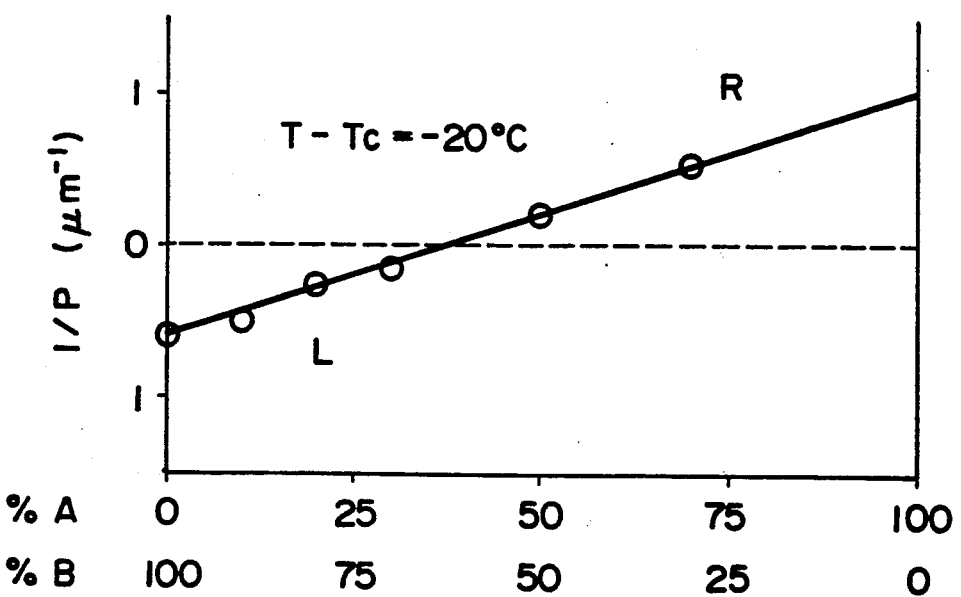
FIGS. 2, 4, 6, 8 and 10 show the change in the reciprocal of helical pitch with variation of concentration of compounds in mixtures of the present invention.

FIG. 1 and FIG. 2 are graphs showing respectively, the concentration dependencies of spontaneous polarization (Ps) and reciprocal of helical pitch ($1/p$) in the two component system of A and B at a temperature (T) which is lower than the upper limit temperature (Tc) of Sc* phase by 20° C., wherein A is a compound of the formula (1) in which m=2, n=1, $$X=-OC-, \quad Y=-CH_2-\overset{*}{C}H-C_2H_5,$$
$$\overset{\|}{O} \qquad \qquad \overset{|}{CH_3}$$

$R=C_8H_{17}O-$ the abolute configuration of optically active group Y is S type and twist sense of helix is right-handed,

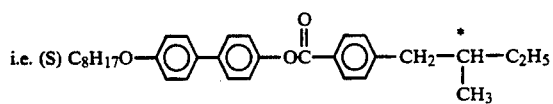

i.e. (S) $C_8H_{17}O$—〈◯〉—〈◯〉—OC—〈◯〉—$CH_2$—$\overset{*}{C}H$—$C_2H_5$
                                            |
                                           $CH_3$ (compound A) and B is a compound of the formula (1) wherein m=1, n=1, $$X=-CO-, \quad Y=OCH_2-\overset{*}{C}H-C_2H_5$$
$$\overset{\|}{O} \qquad \qquad \overset{|}{CH_3}$$

and $R=C_8H_{17}O-$, the absolute configuration of Y is S type and twist sense of helix is left-handed

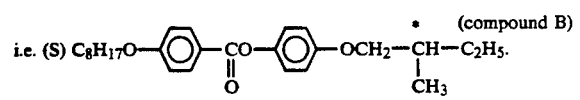

i.e. (S) $C_8H_{17}O$—〈◯〉—CO—〈◯〉—$OCH_2$—$\overset{*}{C}H$—$C_2H_5$. (compound B)
                    ‖                                |
                    O                              $CH_3$ As understandable from FIG. 2, by mixing, helical pitch of the mixture varies and becomes infinitestimal at the concentration of compound A of 40% by weight. On the other hand as shown in FIG. 1, Ps is reduced and becomes lower than the Ps value of either of the component by mixing and becomes zero at about 60 percent by weight of the concentration of compound A. This is suggesting that there are 2 kinds of polarization which offset each other in the spontaneous polarization of chiral smectic liquid crystal compounds. S. T. Lagerwall et al defines the positive and negative of Ps with regard to 2 kinds of spontaneous polarization vector which are perpendicular to the plane, including both the direction of normal of smectic layer i.e. unit vector of direction of helical axis of chiral smectic crystal compound and director-vector which shows average direction of liquid crystal molecule. [See molecular crystal and liquid crystal 114 vol. 151 page (1984).]

As hereinafter described, the inventor et al made investigation with regard to a number of chiral smectic liquid crystal compound which had been synthesized by them and from the result of this investigation, it was confirmed that these smectic liquid crystals can be classified into two groups having mutually opposite spontaneous polarization. The classification of ferroelectric chiral smectic compounds is made by observing a revolving direction of the stage on which a liquid crystal cell filled with a chiral smectic compound is attached to find an extinction position under crossed nicols state of polarization microscope. Negative polarity voltage was applied to the upper side electrode of the cell and positive polarity voltage was applied to the lower side and an extinction position was found by revolving the stage for the initial state. When the polarity of applied voltage was inverted for the second state, counterclockwise or clockwise revolution of the stage may be necessary to find another (second) extinction position, depending upon difference of chiral smectic compounds. Now when the polarity of applied voltage of the cell placed horizontally on the stage is inverted, those which provide an extinction position by revolving a sample stage counterclockwise, are chiral smectic liquid crystal in which a director vector is inclined toward the right side of helical axis. According to the definition of spontaneous polarization by S. T. Lagerwall et al, they are substance of $Ps>0$. On the other hand when a second extinction position can be obtained by revolving a stage clockwise, they are a chiral smectic liquid crystal in which a director is inclined toward the left side of a helical axis and compounds in which the direction of spontaneous polarization is reverse, are substance of $Ps<0$.

According to the definition of positive or negative Ps, in case of the above-mentioned compound A, $Ps>0$ and in case of the compound B, $Ps<0$. In the mixing system consisting of compound A and compound B, the composition of about 40% by weight of the compound A having sufficiently elongated helical pitch, shows reduction of Ps to about $1nC/cm^2$ and preferable composition cannot be obtained.

If the chiral smectic liquid crystal compounds used as a component of the composition of the present invention, are classified according to twist sense of helix and direction of spontaneous polarization, they can be divided into 4 groups.

(a) Substances in which twist sense of helix is right-handed and $Ps>0$

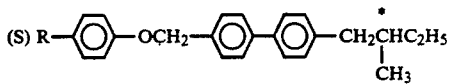

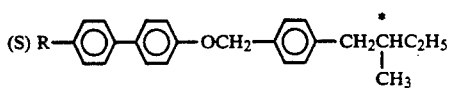

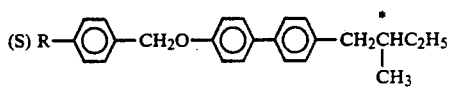

(b) Substances in which twist sense of helix is left-handed and Ps>0

(c) Substances in which twist sense of helix is right handed and Ps<0

(d) Substances in which twist sense of helix is left handed and Ps<0

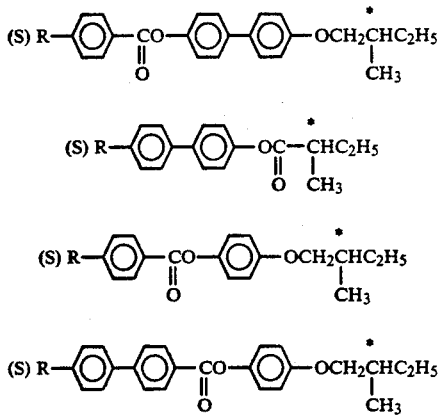

In the above-mentioned general formulae of each group, substituent R represents alkyl or alkoxy group having 1~18 carbon atoms and (S) and (R) represent absolute configurations of optically active substances.

The above-mentioned classification can be summarized in Table 1 as relation of substituent Y having an asymmetric carbon in the formula (1), to twist sense of helix of chiral smectic liquid crystal compounds and direction of spontaneous polarization.

TABLE 1

| direction of spontaneous polarization | twist sense of helix | |
|---|---|---|
| | right-handed | left-handed |
| Ps > 0 | (a) $(S) -CH_2\overset{*}{C}HC_2H_5$ $\phantom{(S) -CH_2C}\vert$ $\phantom{(S) -CH_2C}CH_3$ | (b) $(S) -\underset{\Vert}{C}O\overset{*}{C}HC_6H_{13}$ $\phantom{(S) -COC}O\phantom{C}\vert$ $\phantom{(S) -COC}\phantom{O}CH_3$ |
| | | $(R) -O\overset{*}{C}HC_6H_{13}$ $\phantom{(R) -OC}\vert$ $\phantom{(R) -OC}CH_3$ |
| Ps < 0 | (c) $(S) -\underset{\Vert}{C}OCH_2\overset{*}{C}HC_2H_5$ $\phantom{(S) -COC}O\phantom{HC}\vert$ $\phantom{(S) -COC}\phantom{O}\phantom{HC}CH_3$ | (d) $(S) -OCH_2\overset{*}{C}HC_2H_5$ $\phantom{(S) -OCHC}\vert$ $\phantom{(S) -OCHC}CH_3$ |
| | $(R) -\underset{\Vert}{C}O\overset{*}{C}HC_6H_{13}$ $\phantom{(R) -COC}O\phantom{C}\vert$ $\phantom{(R) -COC}\phantom{O}CH_3$ | $(S) -O\underset{\Vert}{C}-\overset{*}{C}HC_2H_5$ $\phantom{(S) -OCC}O\phantom{C}\vert$ $\phantom{(S) -OCC}\phantom{O}CH_3$ |
| | $(S) -O\overset{*}{C}HC_6H_{13}$ $\phantom{(S) -OC}\vert$ $\phantom{(S) -OC}CH_3$ | |

The composition of the present invention can be obtained concretely by selecting at least one compound each from the above-mentioned compound group (a) and from the compound group (b) and mixing the selected compounds or by selecting at least one compound each from the above-mentioned compound group (c) and from the compound group (d) and mixing the selected compounds. Among the compositions consisting of (a) group compound and (d) group compound,or those consisting of (b) group compound and (c) group compound, there might be a similar compositions to the composition of the present invention in practical properties and performance, but the combination of these groups tends to offset mutually the spontaneous polarization. So they are not ideal combinations.

As illustration, spontaneous polarization and reciprocal of helical pitch of the two component mixed system of a following compound of (c) group: i.e.

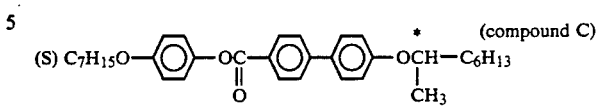

and a following compound of (b) group: i.e.

Figure 3:
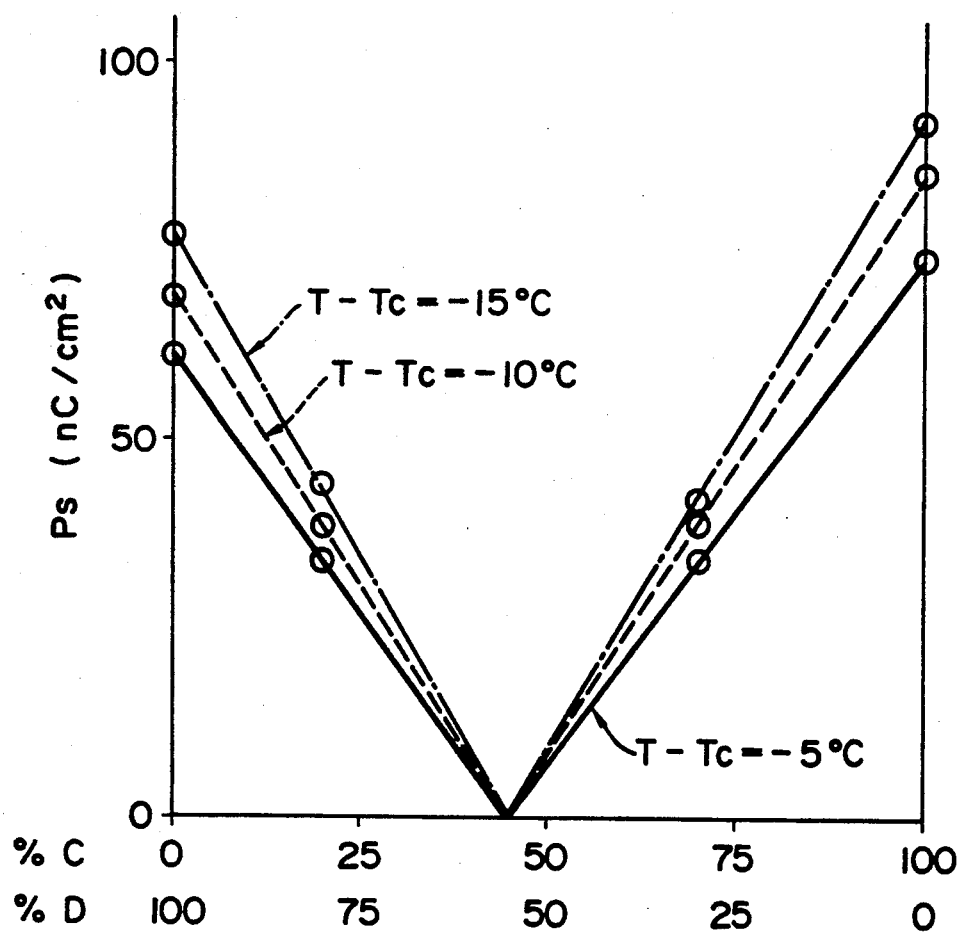
Figure 4:
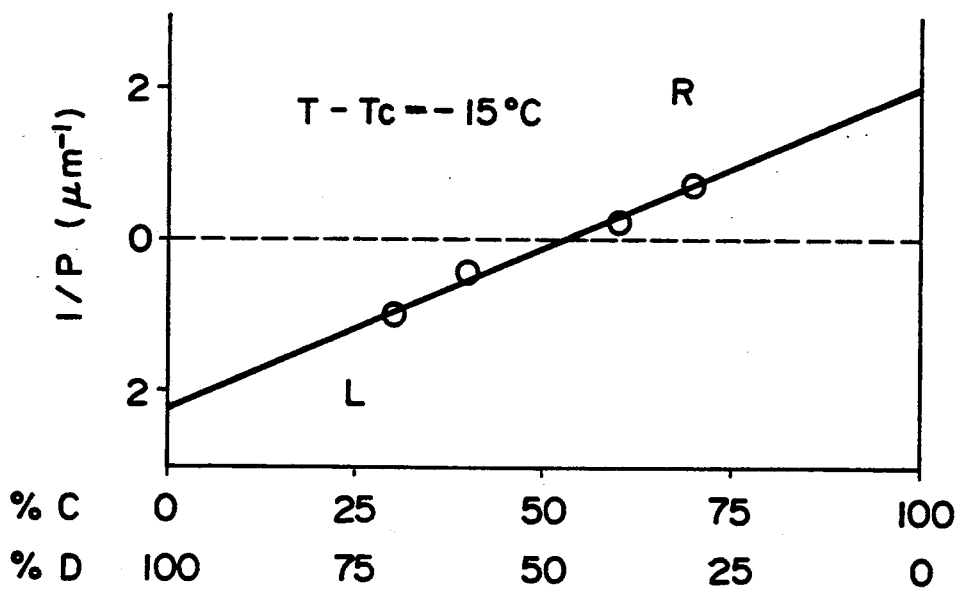

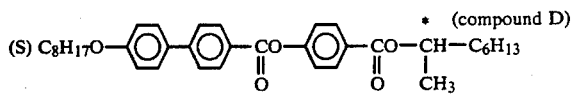

are shown in FIG. 3 and FIG. 4. FIG. 3 is a chart obtained by connecting, point by point of Ps values at temperatures lower than the upper limit temperature (Tc) of Sc* phase of the mixed system, respectively by 5° C., 10° C., and 15° C.,and FIG. 4 is a chart showing reciprocals of helical pitch at T−Tc=−15° C.

The compound C and the compound D are compounds derived from 1-methylheptanol, and show very large values of spontaneous polarization and as in case of the compound A and the compound B, helical pitch become longer depending upon concentration, and at about 50% by weight, it becomes infinitesimal.

On one hand, spontaneous polarization becomes smaller in the opposite way, by being mixed with a compound of opposite direction of spontaneous polarization and at the concentration of the compound C of about 45% by weight, it becomes zero. Spontaneous polarization at the time of infinitesimal of helical pitch is about 7nC/cm$^2$ and spontaneous polarization becomes about 1/10 of those of the compound C and D. Thus the characteristic feature of the compound derived from 1-methylbutanol of extremely large spontaneous polarization has been lost by being mixed with a compound having opposite direction of spontaneous polarization. Since response time of liquid crystal display element used in ferroelectric chiral smectic liquid crystal materials, is in inverse proportion to spontaneous polarization, reduction of Ps as in the above-mentioned case is not preferable.

In the composition of the present invention, the above-mentioned vanishment of Ps does not occur and additive property is established with regard to Ps. These facts are evident from the illustrations of the following three two-component-mixed systems.

Figure 5:
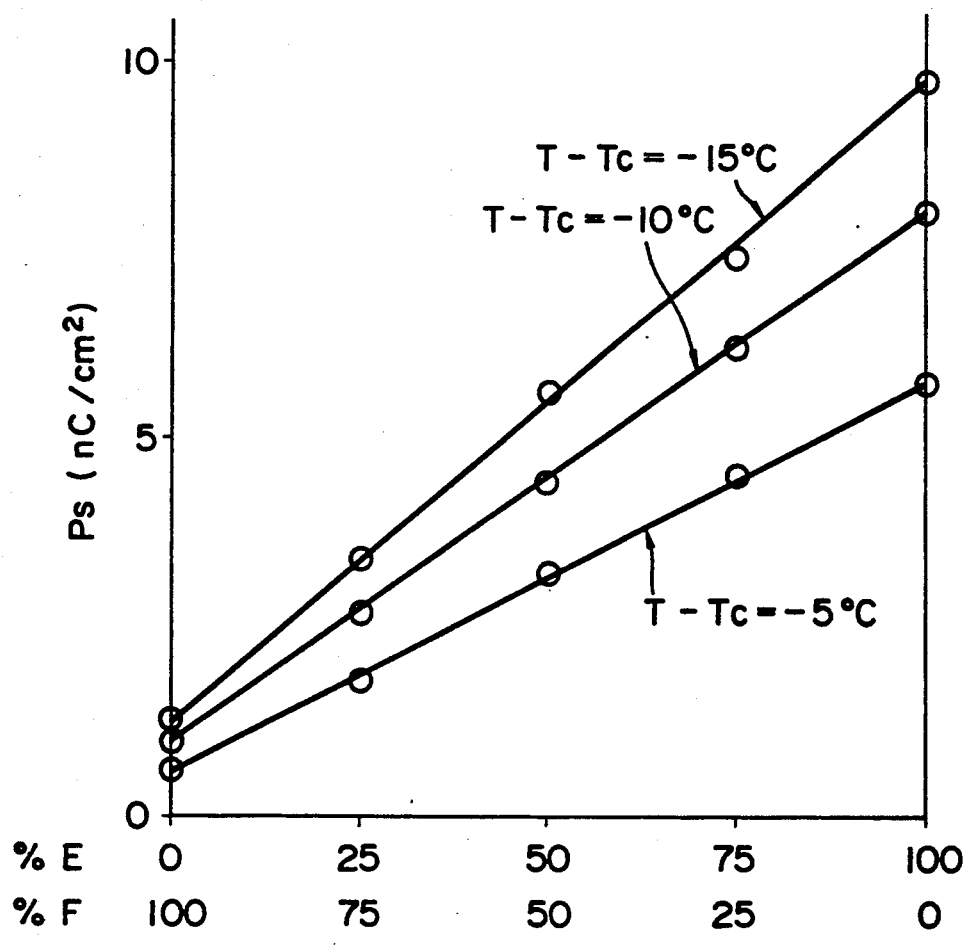
Figure 6:
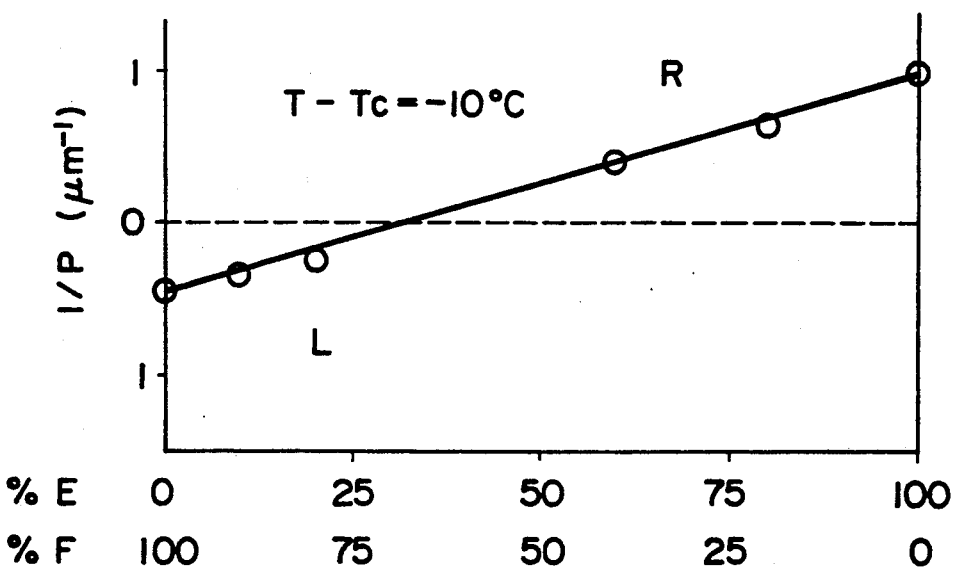

FIG. 5 and FIG. 6 show concentration dependency of spontaneous polarization and reciprocal of helical pitch of two component mixed system of following (c) group compound E and (d) group compound F

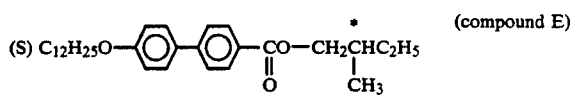

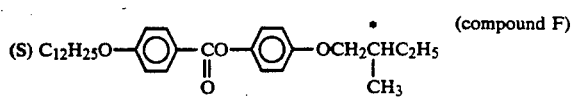

This mixed system of the compound E and the compound F is, as evident from Table 1, same in the direction of spontaneous polarization and a combination of compounds having opposite twist sense of helix. For spontaneous polarization, there is established additive property. With increase of concentration of the compound E, spontaneous polarization becomes greater. On the other hand, helical pitch becomes infinitesimal at a concentration of the compound E of about 30% by weight. At this point, spontaneous polarization is 2~4nC/cm² which is greater than that of the compound F. The effect of mixing of compounds of the same direction of spontaneous polarization is revealed there.

Figure 7:
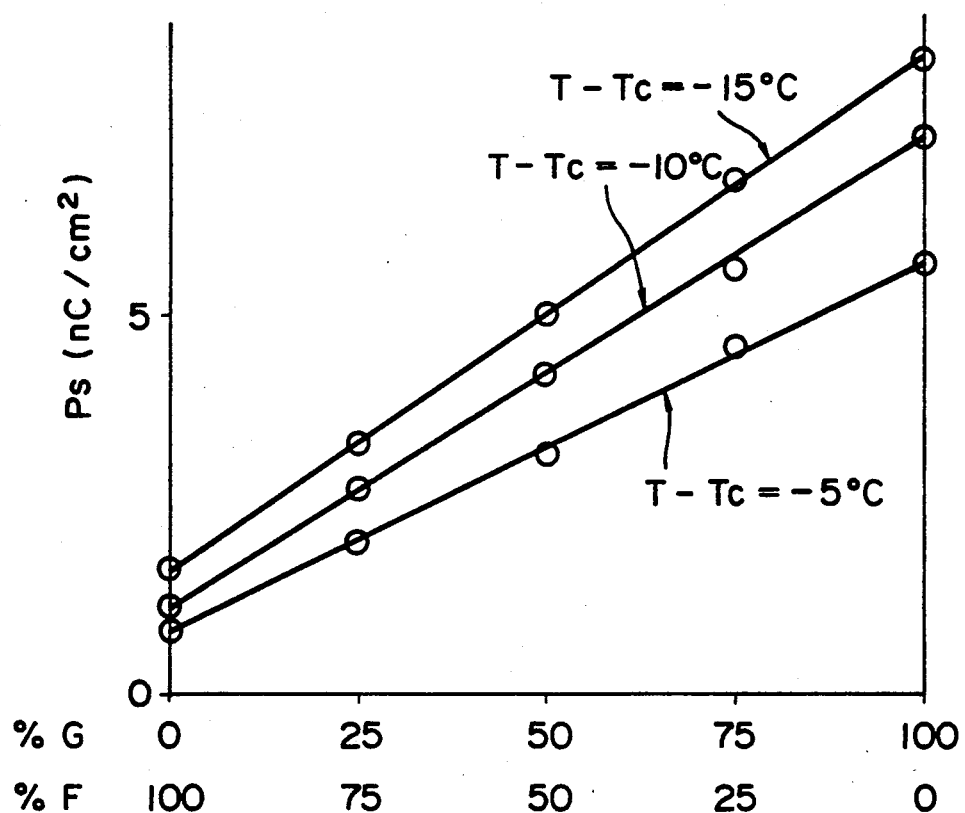
Figure 8:
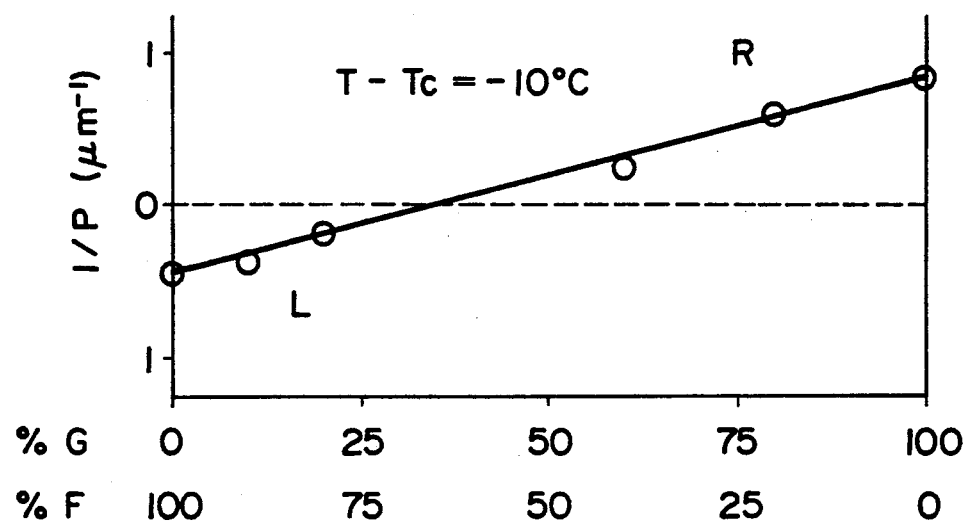

FIG. 7 and FIG. 8 show concentration dependence of spontaneous polarization and reciprocal of helical pitch of two component system of a following compound G of (c) group and the above-mentioned compound F.

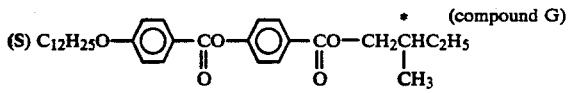
(compound G)

Similarly in case of the mixed system of the compounds E and F, there is established additive property in spontaneous polarization. On the other hand, helical pitch depends on concentration, becomes infinitestimal at a concentration of the compound G of about 35% by weight. Spontaneous polarization at this concentration is 2~4nC/ cm². Effect of mixing of compounds of the same direction of spontaneous polarization is revealed therein.

Figure 9:
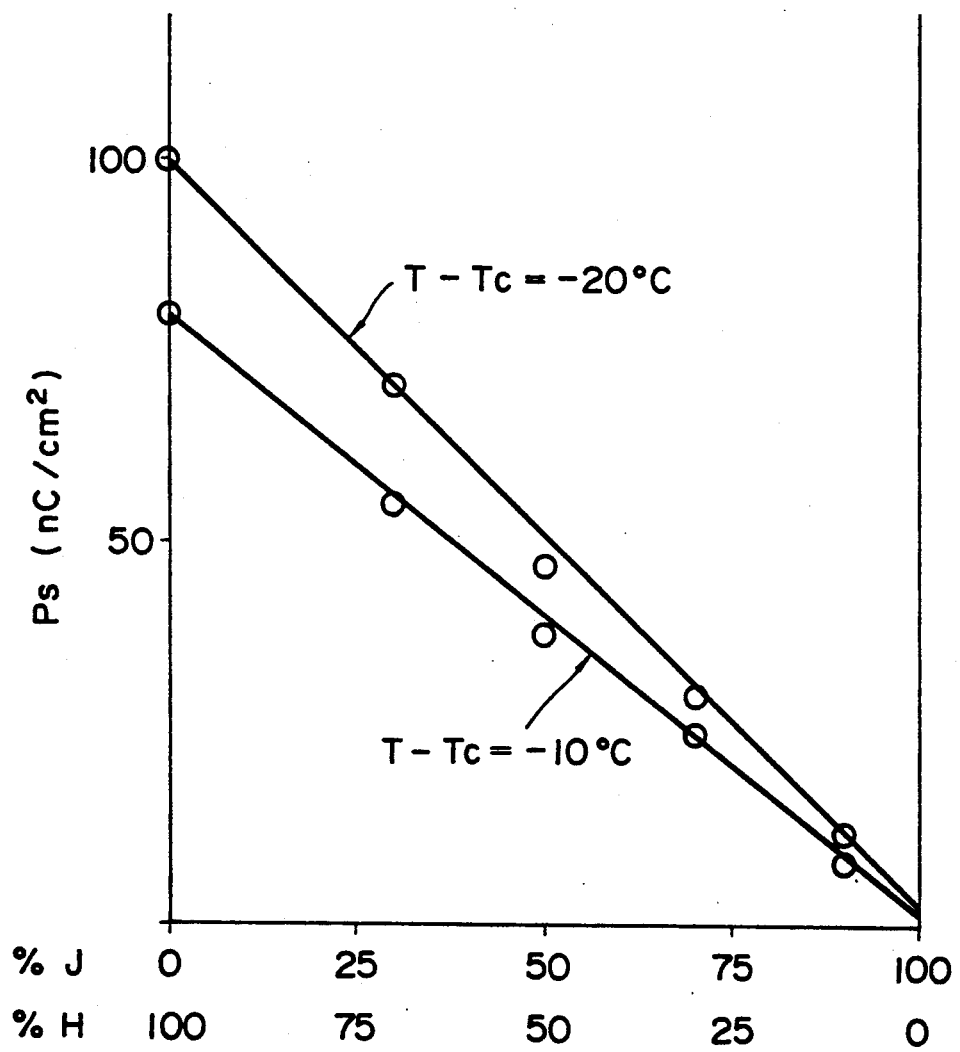
Figure 10:
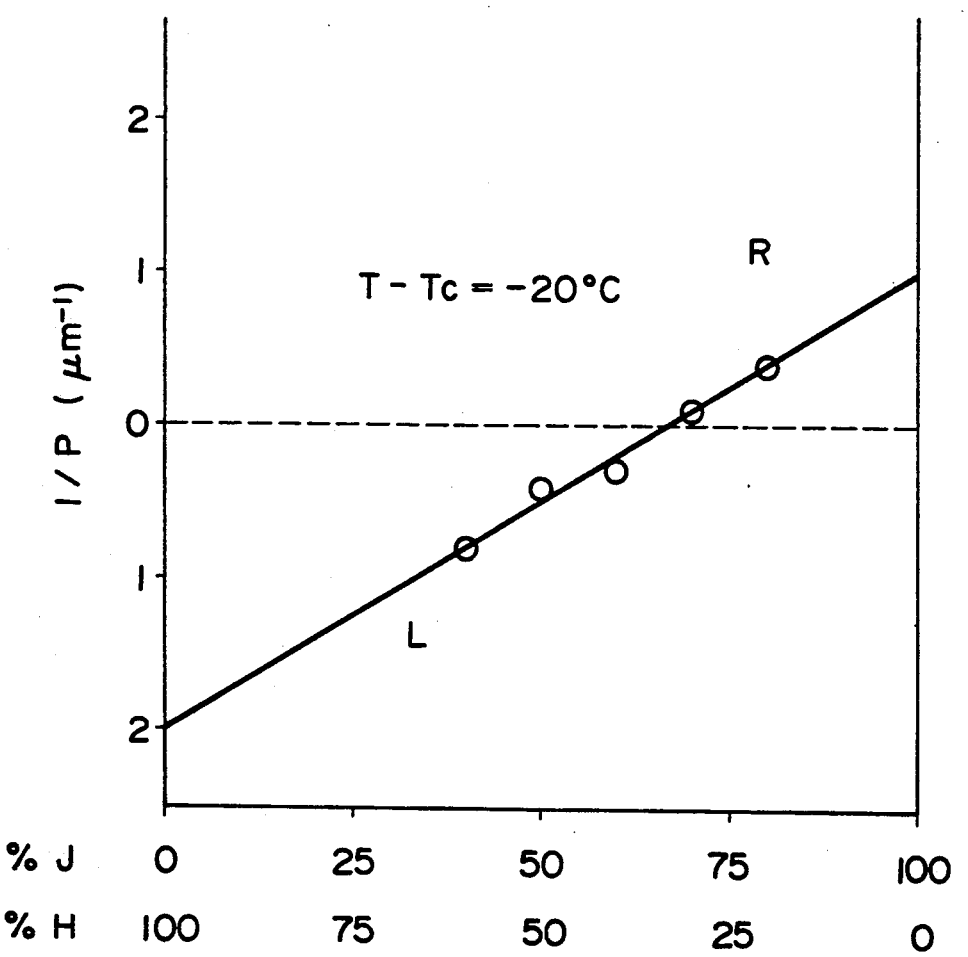

FIG. 9 and FIG. 10 are charts showing concentration dependency of spontaneous polarization and reciprocal of helical pitch in the two component mixed system of following compound H of (b) group and compound J of (a) group, respectively.

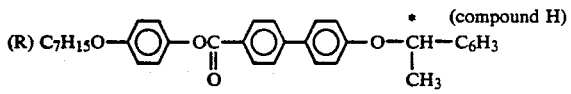
(compound H)

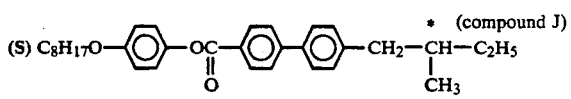
(compound J)

As seen from FIG. 9, there is additive property established in this two component fixed system for spontaneous polarization. From FIG. 10, it is seen that helical pitch of the mixed system becomes infinitesimal at a concentration of the compound B of about 32% by weight. Spontaneous polarization at this concentration is 28~36 nC/cm² as seen from FIG. 9. Similarly in cases of 2 component mixed system of the compounds E and F and the compounds of G and F, respectively, there is revealed the effect of mixing of compounds having the same direction of spontaneous polarization, even in this 2 component mixed system of the compounds H and J.

As explained by illustration, it is possible to extend sufficiently the helical pitch by using, as component, a ferroelectric chiral smectic liquid crystal compound of short helical pitch and obtain a practical liquid crystal material having sufficiently extended helical pitch and large spontaneous polarization. Further it is possible to obtain a light switching element of quick response.

SPECIFIC EXAMPLES

The present invention will be more fully described by way of specific example hereinafter but it is by no means interpreted to be limitative of the invention. Further, spontaneous polarization was measured by Sawyer-Tower's method. Further, the measurement of helical pitch was carried out by utilizing cells to which a homogeneous aligning treatment has been applied (cell distance of 180 μm)and measuring directly the distance of stripe pattern corresponding to full pitch with a polarization microscope.

EXAMPLE 1

A composition consisting of 20% by weight of a following compound in which twist sense of helix is right-handed

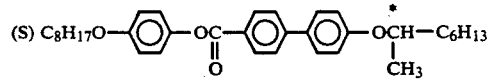

and following three compounds in which twist sense of helix is left-handed i.e.
30% by weight of by weight of

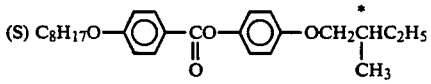

25% by weight of

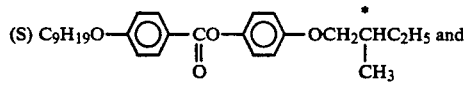  and

25% by weight of

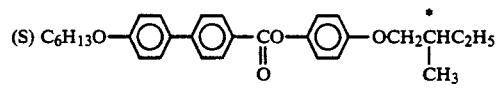

were prepared.

This composition showed Sc* phase in the temperature range of 18°~56° C., SA phase in the higher temperature side of Sc* phase and becomes isotropic liquid at 73° C.. The helical pitch and spontaneous polarization at 20° C. were, 12 μm and 20nC/cm², respectively.

EXAMPLE 2

A composition consisting of following two kinds of compound in which twist sense of helix is right-handed i.e.
20% by weight of

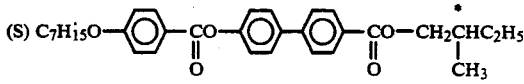

and 25% by weight of

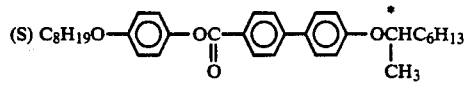

and following two kinds of compound in which twist sense of helix is left-handed i.e.
25% by weight of

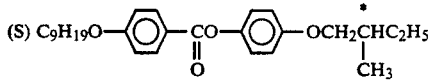

20% by weight of

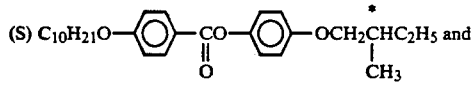

10% by weight of nematic liquid crystal compound

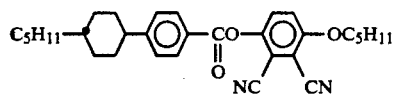

was prepared.

This composition showed Sc* phase in the range of 0~°70° C., SA phase in the higher temperature side and turned to cholesteric phase at 90° C. and to isotropic liquid phase at 100° C.

The helical pitch and spontaneous polarization of this composition at 25° C., were 10 μm and 25nC/cm², respectively.

EXAMPLE 3

A composition consisting of 20% by weight of a following compound in which twist sense of helix is right-handed i.e.

20% by weight of

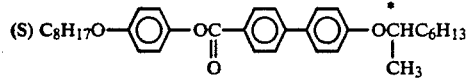

and following three kinds of compound in which twist sense of helix is left-handed i.e.

35% by weight of

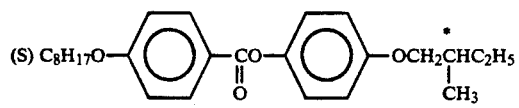

25% by weight of

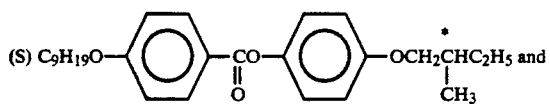

10% by weight of

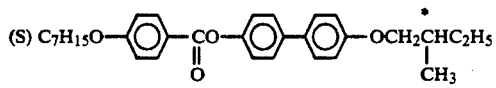

and 10% by weight of following nematic liquid crystal compound

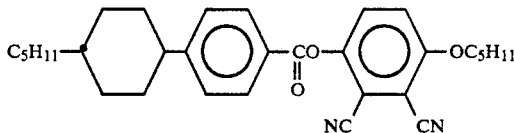

were prepared.

This composition showed Sc* phase in the range of 0~°66° C., turned to SA phase at 66° C., to cholesteric phase at 69° C. and to isotropic liquid at 85° C.. The spontaneous polarization and helical pitch at 25° C. were 18nC/cm² and 3 μm, respectively.

COMPARATIVE EXAMPLE 1

A liquid crystal composition was prepared by using the component and proportion, the same with those of Example 3 except that in place of the compound in which twist sense of helix is right-handed in Example 3, its following optical isomer in an amount of 20% by weight was used.

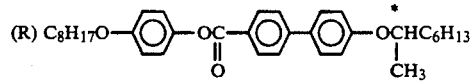

The phase transition temperature was the same with that of the composition of Example 3 but spontaneous polarization was 10nC/cm² at 25° C. and helical pitch was 2 μm.

Because of the fact that the optical isomer in which the absolute configuration is R type, which is used as a component herein, was left-handed in the twist sense of helix and the direction of spontaneous polarization was reverse to that of other chiral smectic liquid crystal component, the helical pitch of this composition was small, and spontaneous polarization was about ½ as compared with that of Example 3.

EXAMPLE 4

A composition consisting of following 2 kinds of compound in which twist sense of helix is right-handed i.e. 20% by weight of

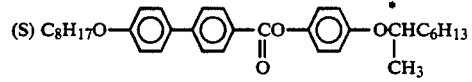

10% by weight of

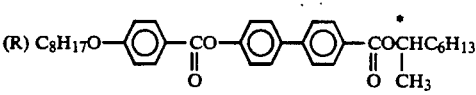

and following 2 kinds of compound in which twist sense of helix is left-handed, i.e.

40% by weight of

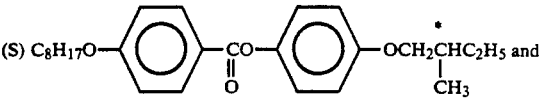

30% by weight of

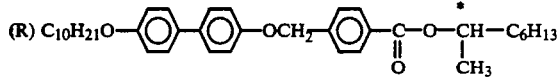

was prepared.

This composition showed Sc* phase at the temperature range of 17~49° C., SA phase at a temperature higher than 49° C. and turned to isotropic liquid phase at 75° C. At 20° C., this composition had a helical pitch of 15 μm and a spontaneous polarization of 19nC/cm².

EXAMPLE 5

A composition consisting of following two kinds of compound in which twist sense of helix is right-handed, i.e. 10% by weight of

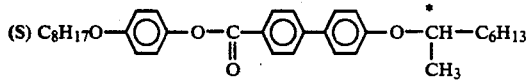

and 25% by weight of

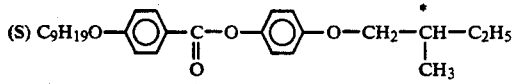

and following two kinds of compound in which twist sense of helix is left-handed, i.e.
30% by weight

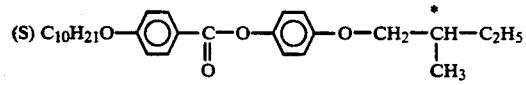

25% by weight

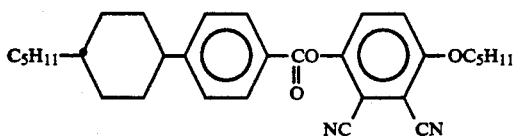

and 10% by weight of a nematic liquid crystal compound having a formula

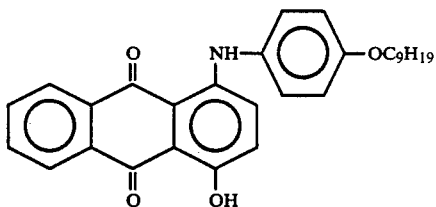

was prepared.

This liquid crystal composition showed Sc* phase at a temperature range of 0° C. ~65° C., $S_A$ phase at the side of higher temperature and turned to isotropic liquid at 80° C. This composition showed a very long helical pitch as long as 6 μm at 25° C. and a very large spontaneous polarization such as 33nC/cm². A ferroelectric chiral smectic liquid crystal composition having a large spontaneous polarization in spite of its long helical pitch could be obtained.

EXAMPLE 6

A liquid crystal composition prepared as in Example 1 was filled in a cell having been subjected to parallel aligning treatment of its surface, i.e. by coating PVA, as an aligning treatment agent and rubbing the surface, which is provided with transparent electrodes and having a cell gap of 2 μm. This liquid crystal cell was inserted between two polarizers arranged in crossed nicol state and a low frequency AC of 0.5 Hz, 15 V was applied whereby clear-cut switching operation of very good contrast was observed. Thus a liquid crystal display element which provides very quick response such as 0.8 msec at 20° C. in response time could be obtained.

EXAMPLE 7

A liquid crystal cell was made by filling the liquid crystal composition prepared as in Example 5, into a cell having been subjected to a surface treatment for parallel alignment by coating polyvinyl alcohol (PVA), as an aligning treatment agent and rubbing the surface, which is provided with transparent electrodes and having a cell gap of 2 μm. This liquid crystal cell was inserted between two polarizers arranged in crossed nicol state and a low frequency AC of 0.5 Hz, 15 V was applied, whereby clear-cut switching operation of very good contrast was observed and a liquid crystal display element of very quick response such as 0.6 msec of response time of 25° C. could be obtained.

EXAMPLE 8

A composition was prepared by adding 3% by weight of an anthraquinone type dye D-16 (supplied from BDH Co.) having a following formula to the liquid crystal composition prepared as in Example 2 to make it guest-host type. This composition was filled in a cell having been subjected to the same treatment as in Example 6 and a cell gap of 8 μm, one of the polarizer was arranged so as to make its polarization plane parallel to the molecular axis and a low frequency AC of 0.5 Hz, 15 V was applied whereby clear-cut switching operation of very good contrast was observed and a color liquid crystal display element of a very quick response such as 1.8 msec of response time at 25° C. was obtained.

EXAMPLE 9

By using the liquid crystal composition prepared as in Example 4 and the dye used in Example 8, a guest-host type liquid crystal composition was prepared similarly as in Example 8. This composition was filled in a cell having been subjected to the treatment as in Example 6, of a cell gap of 5 μm and provided with transparent electrodes to prepare a color liquid crystal display cell. This liquid crystal cell was arranged so as to make the polarization plane of one of the polarizer parallel to a molecular axis and a low frequency AC of 0.5 Hz and 15

BRIEF EXPLANATION OF THE DRAWINGS

FIG. 1 and FIG. 2, are, respectively graphs of spontaneous polarization and reciprocal of helical pitch of two component system consisting compound A and Compound B.

FIG. 3, and FIG. 4; FIG. 5 and FIG. 6; FIG. 7 and FIG. 8; and FIG. 9 and FIG. 10 are respectively graphs of spontaneous polarization and reciprocal of helical pitch of the mixed system of two component system consisting of compounds of C and D, compounds of E and F, compounds of F and G and compounds of H and J. In FIGS. 2, 4, 6, 8 and 10, R and L means, respectively that twist sense of helixes are right-handed and left-handed.

What is claimed is:

1. In a ferroelectric chiral smectic liquid crystal composition comprising at least one chiral smectic liquid crystal compound having a right-handed helical twist sense and expressed by the below-described formula (I) and at least one chiral smectic liquid crystal compound having a left-handed helical twist sense and expressed by the formula:

$$R\text{---}\left(\bigcirc\right)_m\text{---}X\text{---}\left(\bigcirc\right)_n\text{---}Y \quad (I)$$

wherein R represents an alkyl or alkoxy group of 1–18 carbon atoms: m and n each represent an integer of 1 or 2: X represents $$-\underset{\underset{O}{\|}}{C}O-, \quad -CH=N-, \quad -CH_2O-,$$

$$-\underset{\underset{O}{\|}}{O}C-, \quad -N=CH-, \quad -OCH_2-,$$

or a single bond: and Y represents an alkyl, alkoxy, alkoxycarbonyl, alkanoyl or alkanoyloxy group having an asymmetric carbon atom, the improvement which comprises, (1) in said at least one chiral smectic liquid crystal compound having a right-handed helical twist sense Y is $$(S)\text{---}\overset{*}{C}H_2CHC_2H_5$$
$$\qquad\qquad|$$
$$\qquad\qquad CH_3$$

and in said at least one chiral smectic liquid crystla compound having a left-handed helical twist seanse; Y is $$(S)\text{---}\underset{\underset{O}{\|}}{C}O\overset{*}{C}HC_6H_{13} \quad \text{or} \quad (R)\text{---}O\overset{*}{C}HC_6H_{13},$$
$$\qquad\qquad|\qquad\qquad\qquad\qquad\qquad|$$
$$\qquad\qquad CH_3 \qquad\qquad\qquad\qquad CH_3$$

or (2) in said at least one chiral smectic liquid crystal compound having a right-handed helical twist sense Y is $$(S)\text{---}\underset{\underset{O}{\|}}{C}O\overset{*}{C}HC_2H_5, \ (R)\text{---}\underset{\underset{O}{\|}}{C}O\overset{*}{C}HC_6H_{13}, \ \text{or} \ (S)\text{---}O\overset{*}{C}HC_6H_{13}$$
$$\qquad\qquad|\qquad\qquad\qquad\qquad\qquad|\qquad\qquad\qquad\qquad|$$
$$\qquad\qquad CH_3 \qquad\qquad\qquad\qquad CH_3 \qquad\qquad\qquad\qquad CH_3$$

and in said at least one chiral smectic liquid crystal compound having a left-handed helical twist sense, Y is $$(S)\text{---}O\overset{*}{C}H_2CHC_2H_5 \quad \text{or} \quad (S)\text{---}O\underset{\underset{O}{\|}}{C}\text{---}\overset{*}{C}HC_2H_5.$$
$$\qquad\qquad|\qquad\qquad\qquad\qquad\qquad\qquad|$$
$$\qquad\qquad CH_3 \qquad\qquad\qquad\qquad\qquad CH_3$$

2. A light switching element which comprises at least one ferroelectric chiral smectic liquid crystal composition as set froth in (1) or (2) of claim 1.

3. A composition according to claim 1 consisting of 20% by weight of a following compound in which twist sense of helix is right-handed $$(S)\ C_8H_{17}O\text{---}\bigcirc\text{---}O\underset{\underset{O}{\|}}{C}\text{---}\bigcirc\text{---}\bigcirc\text{---}O\overset{*}{C}H\text{---}C_6H_{13}$$
$$\qquad\qquad\qquad\qquad\qquad\qquad\qquad\qquad\qquad\qquad|$$
$$\qquad\qquad\qquad\qquad\qquad\qquad\qquad\qquad\qquad\qquad CH_3$$

and following three compounds in which twist sense of helix is left-handed:

30% by weight of $$(S)\ C_8H_{17}O\text{---}\bigcirc\text{---}\underset{\underset{O}{\|}}{C}O\text{---}\bigcirc\text{---}O\overset{*}{C}H_2CHC_2H_5$$
$$\qquad\qquad\qquad\qquad\qquad\qquad\qquad\qquad|$$
$$\qquad\qquad\qquad\qquad\qquad\qquad\qquad\qquad CH_3$$

25% by weight of $$(S)\ C_9H_{19}O\text{---}\bigcirc\text{---}\underset{\underset{O}{\|}}{C}O\text{---}\bigcirc\text{---}O\overset{*}{C}H_2CHC_2H_5 \text{ and}$$
$$\qquad\qquad\qquad\qquad\qquad\qquad\qquad\qquad|$$
$$\qquad\qquad\qquad\qquad\qquad\qquad\qquad\qquad CH_3$$

25% by weight of $$(S)\ C_6H_{13}O\text{---}\bigcirc\text{---}\bigcirc\text{---}\underset{\underset{O}{\|}}{C}O\text{---}\bigcirc\text{---}O\overset{*}{C}H_2CHC_2H_5$$
$$\qquad\qquad\qquad\qquad\qquad\qquad\qquad\qquad\qquad\qquad|$$
$$\qquad\qquad\qquad\qquad\qquad\qquad\qquad\qquad\qquad\qquad CH_3$$

4. A composition according to claim 1 consisting of the following two compounds in which twist sense of helix is right-handed 20% by weight of $$(S)\ C_7H_{15}O\text{---}\bigcirc\text{---}\underset{\underset{O}{\|}}{C}O\text{---}\bigcirc\text{---}\bigcirc\text{---}\underset{\underset{O}{\|}}{C}O\text{---}CH_2\overset{*}{C}HC_2H_5$$
$$\qquad\qquad\qquad\qquad\qquad\qquad\qquad\qquad\qquad\qquad\qquad\qquad|$$
$$\qquad\qquad\qquad\qquad\qquad\qquad\qquad\qquad\qquad\qquad\qquad\qquad CH_3$$

and 25% by weight of

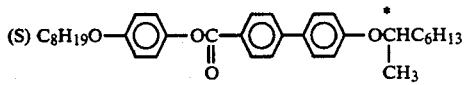

and following two kinds of compound in which twist sense of helix is left-handed:

25% by weight of

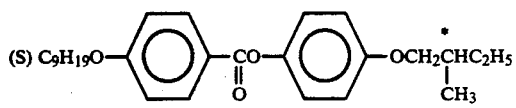

20% by weight of

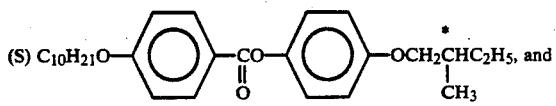

10% by weight of nematic liquid crystal compound

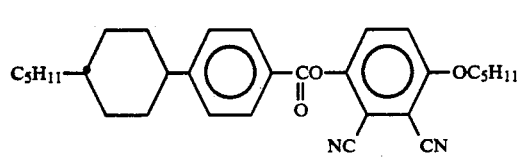

5. A composition according to claim 1 consisting of 20% by weight of the following compound in which twist sense of helix is right-handed

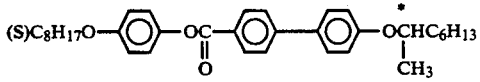

and the following three compounds in which twist sense of helix is left-handed

35% by weight of

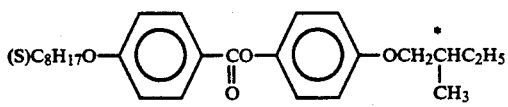

25% by weight of

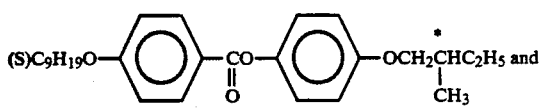

10% by weight of

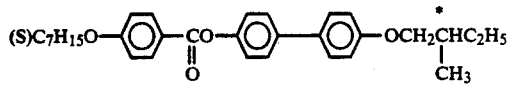

and 10% by weight of following nematic liquid crystal compound

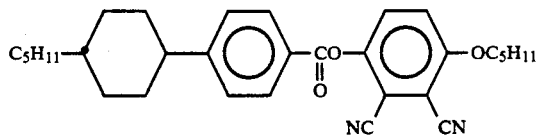

6. A composition according to claim 11 consisting of 20% by weight of

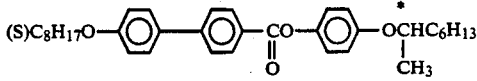

10% by weight of

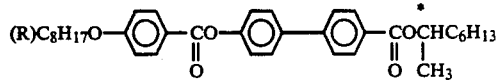

40% by weight of

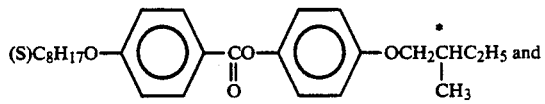

30% by weight of

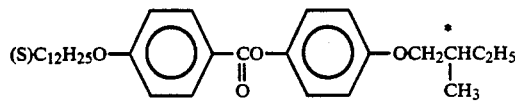

7. A composition according to claim 1 consisting of 10% by weight of

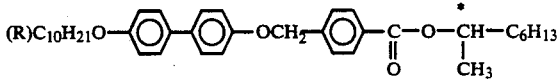

25% by weight of

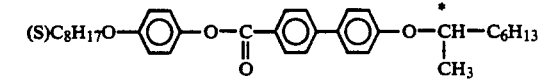

30% by weight of

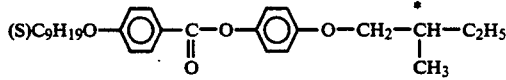

25% by weight of

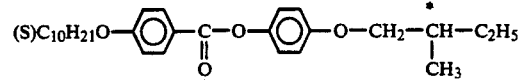

and 10% by weight of a nematic liquid crystal compound having a formula

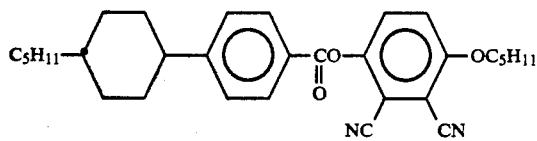

8. In a ferroelectric chiral smectic liquid crystal composition comprising at least one chiral smectic liquid crystal compound having a right-handed helical twist sense and expressed by the below-described formula (I) and at least one chiral smectic liquid crystal compound having a left-handed helical twist sense and expressed by the formula:

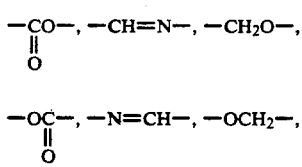 (I)

wherein R represents an alkyl or alkoxy group of 1-16 carbon atoms; m and n each represent an integer of 1 or 2; X represents

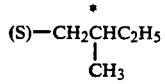

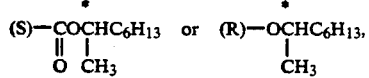

or a single bond; and Y represents an alkyl, alkoxy, alkoxycarbonyl, alkanoyl or alkanoyloxy group having an asymmetric carbon atom, the improvement which comprises, (1) in said at least one chiral smectic liquid crystal compound having a right-handed helical twist sense Y is $$\text{(S)}-\overset{*}{\text{CH}_2\text{CHC}_2\text{H}_5}$$
$$\phantom{\text{(S)}-\text{CH}_2\text{C}}|$$
$$\phantom{\text{(S)}-\text{CH}_2\text{CH}}\text{CH}_3$$

and in said at least one chiral smectic liquid crystla compound having a left-handed helical twist seanse; Y is

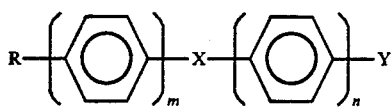

or (2) in said at least one chiral smectic liquid crystal compound having a right-handed helical twist sense Y is

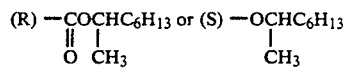

and in said at least one chiral smectic liquid crystal compound having a left-handed helical twist sense, Y is

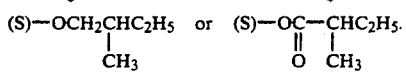

9. A ferroelectric chrial smectic liquid crystal composition according to claim 8 which comprises at least one chiral smectic liquid crystal compound having a right-handed helical twist sense wherein Y is

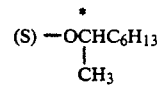

and at least one chiral smectic liquid crystal compound having a left-handed helical twist sense wherein Y is

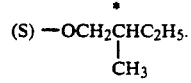

10. A light switching element which comprises at least one ferroelectric chiral smectic liquid crystal composition as set forth in (1) or (2) of claim 8.

11. A light switching element which comprises at least one ferroelectric chiral smectic liquid crystal composition as set forth in claim 9.

12. A device for affecting incident electromagnetic radiation comprising a ferroelectric liquid crystal material, means for containing said ferroelectric liquid crystal material to establish a device thickness and means for producing an electric field characterized in that said ferroelectric liquid crystal material is stable and comprises at least two components wherein at least one of said components has the opposite twist sense from a second of said components, whereby the pitch of said ferroelectric liquid crystal material is greater than 50 percent of said device thickness, wherein said components are chosen so that the spontaneous polarization of said ferroelectric liquid crystal material is greater than $0.2 \times 10^{-8}$ coul/cm$^2$, and wherein the spontaneous polarization of at least two of said components is in the same sense.

* * * * *